(12) United States Patent
Kim

(10) Patent No.: US 8,711,266 B2
(45) Date of Patent: Apr. 29, 2014

(54) DIGITAL PHOTOGRAPHING APPARATUS

(75) Inventor: Kyoung-ae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 687 days.

(21) Appl. No.: 12/419,611

(22) Filed: Apr. 7, 2009

(65) Prior Publication Data

US 2009/0251587 A1    Oct. 8, 2009

(30) Foreign Application Priority Data

Apr. 8, 2008   (KR) .................. 10-2008-0032654

(51) Int. Cl.
*H04N 5/222* (2006.01)
*H04N 5/225* (2006.01)
*G09G 5/00* (2006.01)

(52) U.S. Cl.
USPC .............. 348/333.12; 348/216.1; 345/204

(58) Field of Classification Search
USPC .............. 348/227.1, 220.1, 216.1, 333.11, 348/333.12; 345/204
See application file for complete search history.

(56) References Cited

U.S. PATENT DOCUMENTS

| | | | |
|---|---|---|---|
| 6,313,877 B1 * | 11/2001 | Anderson | 348/333.05 |
| 7,630,015 B2 * | 12/2009 | Okamura | 348/371 |
| 2005/0219394 A1 * | 10/2005 | Du et al. | 348/333.12 |
| 2005/0279922 A1 * | 12/2005 | Wittenberg et al. | 250/234 |
| 2006/0172767 A1 * | 8/2006 | Cathey et al. | 455/556.1 |
| 2006/0176408 A1 * | 8/2006 | Choi | 348/744 |
| 2007/0146356 A1 * | 6/2007 | Ladouceur | 345/207 |
| 2007/0248342 A1 * | 10/2007 | Tamminen et al. | 396/67 |
| 2009/0146961 A1 * | 6/2009 | Cheung et al. | 345/172 |

FOREIGN PATENT DOCUMENTS

JP    2007-104108 A    4/2007

OTHER PUBLICATIONS

Office Action issued for KR 10-2008-0032654 (Feb. 27, 2014).

* cited by examiner

*Primary Examiner* — Trung Diep
(74) *Attorney, Agent, or Firm* — Drinker Biddle & Reath LLP

(57) ABSTRACT

A digital photographing apparatus may include a display unit and a controller electronically coupled to the display unit. The controller may be configured to adjust a moving picture or an image displayed on the display unit based on ambient brightness.

17 Claims, 3 Drawing Sheets

DIGITAL PHOTOGRAPHING APPARATUS

CROSS-REFERENCE TO RELATED PATENT APPLICATIONS

This application claims the benefit of Korean Patent Application No. 10-2008-0032654, filed on Apr. 8, 2008 in the Korean Intellectual Property Office, the entire contents of which is incorporated herein in by reference.

BACKGROUND OF THE INVENTION

1. Field of the Invention

The present invention relates to a digital photographing apparatus, and more particularly, to a digital photographing apparatus which adjusts a moving picture or an image displayed on the display unit based on ambient brightness and/or based on a manner mode switch.

2. Description of the Related Art

Digital photographing apparatuses store still image data or moving picture data in a storage medium in a photographing mode when a photographing operation is performed, and display a still image or a moving picture on a display unit by using the still image data or the moving picture data stored in the storage medium. In addition, digital photographing apparatuses display a live view moving picture which is a real-time moving picture, on a display unit in a photographing mode and display a still image that is obtained immediately before the live view moving picture is displayed on the display unit, on the display unit.

However, a conventional digital photographing apparatus displays a still image, a moving picture or a live view moving picture, which have the same brightness as each other, on a display unit. As such, when an ambient brightness of a place where the digital photographing apparatus is positioned is low, people may feel uncomfortable due to glare in a dark environment as a result of the brightness of an image of the display unit of the digital photographing apparatus.

SUMMARY OF THE INVENTION

A digital photographing apparatus may include a display unit and a controller electronically coupled to the display unit. The controller may be configured to adjust a moving picture or an image displayed on the display unit based on ambient brightness.

The digital photographing apparatus may have the controller configured to adjust the moving picture or the image displayed by reducing the size of the moving picture or the imaged displayed on the display unit.

The digital photographing apparatus may have the controller configured to adjust the moving picture or the image displayed by reducing the brightness of the moving picture or the imaged displayed on the display unit.

The digital photographing apparatus may have the controller configured to adjust the moving picture or the image displayed by reducing the brightness and reducing the size of the moving picture or the imaged displayed on the display unit.

The digital photographing apparatus may have the controller configured to adjust the moving picture or the image displayed on the display unit only after a predetermined period of time.

The digital photographing apparatus may further comprise an ambient brightness sensor. The controller may be electronically coupled to the ambient brightness sensor and configured to adjust the moving picture or the image displayed on the display unit based on the ambient brightness detected by the ambient brightness sensor.

The digital photographing apparatus may have the controller configured to adjust the moving picture or the image displayed on the display unit when the ambient brightness detected by the ambient sensor is less than a predetermined brightness.

The digital photographing apparatus may have the controller configured to adjust the moving picture or the image displayed on the display unit when the ambient brightness detected by the ambient sensor is less than a predetermined brightness for a predetermined amount of time.

The digital photographing apparatus may have the controller configured to adjust the moving picture or the image displayed on the display unit based on comparing the ambient brightness detected by the ambient brightness sensor with the brightness of the moving picture or the still image displayed on the display unit.

The digital photographing may include a manner mode switch electrically coupled to the controller. The digital photographing may have the controller configured to adjust the moving picture or the image displayed only if the manner mode switch is on.

The digital photographing may include a flash-light amount sensor electrically connected to the controller. The digital photographing may have the controller configured to adjust the moving picture or the image displayed based on the amount of light determined to be needed by the flash-light amount sensor for taking a live moving picture or for taking a live still image.

The moving picture or the image displayed on the display unit may be a live moving picture or may be a live image displayed on the display unit.

The moving picture or the image displayed on the display unit is from data stored in a storage medium.

A digital photographing apparatus may include a display unit, a manner mode switch, and a controller electronically coupled to the display unit and the manner mode switch. The controller may be configured to adjust a moving picture or an image displayed on the display unit when the manner mode switch is on.

The digital photographing apparatus may include the controller configured to adjust the moving picture or the image displayed by reducing the size of the moving picture or the imaged displayed on the display unit.

The digital photographing apparatus may include the controller configured to adjust the moving picture or the image displayed by reducing the brightness of the moving picture or the imaged displayed on the display unit.

The digital photographing apparatus may include the controller configured to adjust the moving picture or the image displayed on the display unit only after a predetermined period of time.

The digital photographing apparatus may further comprise a manual reduce button electrically connected to the controller and a manual enlarge button electrically connected to the controller. The controller may be configured to reduce the size of the moving picture or the image displayed on the display unit when the reduce button is on, and the controller may be configured to enlarge the size of the moving picture or the image displayed on the display unit when the enlarge button is on.

The digital photographing apparatus may further comprise a manual reduce button electrically connected to the controller and a manual enlarge button electrically connected to the controller. The controller may be configured to reduce the brightness of the moving picture or the image displayed on the display unit when the reduce button is on, and the controller may be configured to increase the brightness of the moving picture or the image displayed on the display unit when the enlarge button is on.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The present invention will now be described in detail by explaining exemplary embodiments of the invention with reference to the attached drawings.

Figure 1:
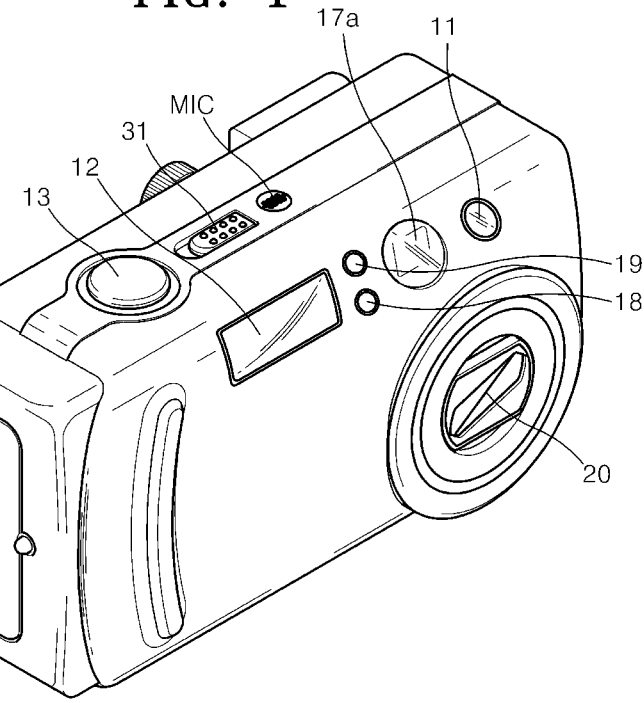
FIG. 1 is a perspective view of a digital photographing apparatus according to an example of an embodiment of the present invention.
Figure 2:
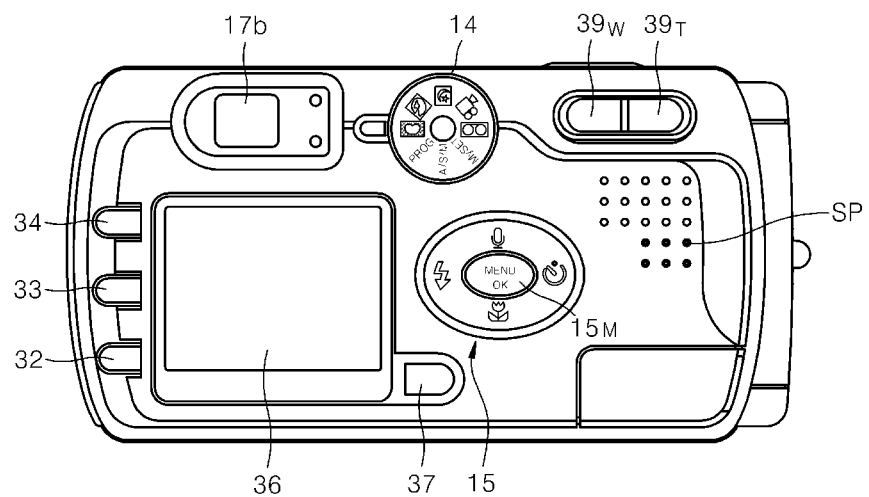
FIG. 2 is a rear view of the digital photographing apparatus illustrated in FIG. 1, according to an example of an embodiment of the present invention.

FIG. 1 is a perspective view of a digital photographing apparatus according to an example of an embodiment of the present invention, and FIG. 2 is a rear view of the digital photographing apparatus illustrated in FIG. 1, according to an example of an embodiment of the present invention.

Referring to FIG. 1, a microphone (MIC), a self-timer lamp 11, a flash 12, a shutter release button 13, a viewfinder 17a, a remote control receiving unit 18, a flash-light amount sensor 19, a lens unit 20, and a power switch 31 are disposed on the digital photographing apparatus.

In a self-timer mode, the self-timer lamp 11 operates during a setting time ranging from a time in which the shutter release button 13 is pressed to a time in which an image is captured. The flash-light amount sensor 19 detects the amount of light when the flash 12 operates and inputs the amount of light to a digital photographing apparatus processor (not shown) by using a controller (not shown). The remote control receiving unit 18 receives a command signal that is output from a remote controller (not shown), for example, a photographing command signal and inputs the received photographing command signal to the digital photographing apparatus processor (not shown) by using the controller (not shown).

Referring to FIG. 2, a speaker SP, a mode dial 14, function buttons 15, a viewfinder 17b, a display unit button 32, a manual-focus/delete/reduce button 33, a manual-adjust/playback/stop/enlarge button 34, a playback mode button 37, a display unit 36, a wide angle-zoom button $39_W$, and a telephoto-zoom button $39_T$ are disposed in the rear of the digital photographing apparatus illustrated in FIG. 1.

In an embodiment, the mode dial 14 is used to select one operation mode from various operation modes of the digital photographing apparatus of FIG. 1, such as a simple photographing mode, a program photographing mode, a person photographing mode, a night view photographing mode, a manual photographing mode, a moving picture photographing mode, and a user set mode and/or recording mode.

In an embodiment, the function buttons 15 are used to select specific functions of the digital photographing apparatus of FIG. 1 or to move an image when an image is displayed on a display panel. In addition, the function buttons 15 are used as directional buttons of an activation cursor in a menu screen of the display unit 36.

The display unit button 32 may be used to control an operation of the display unit 36. The manual-focus/delete/reduce button 33 may be used to manually perform focusing or deleting in a photographing mode. In embodiments, the controller may reduce the size and/or the brightness of an image displayed on the display unit 36 in response to the manual-focus/delete/reduce button 33 being placed in an on position. The manual-adjust/play/stop/enlarge button 34 may be used by the user to manually adjust specific conditions. In addition, in a playback mode, when a user presses the manual-adjust/playback/stop/enlarge button 34 in a state where the user selects one moving picture file, the user may playback or stop the selected moving picture file. In embodiments, the controller may increase the size and/or the brightness of an image displayed on the display unit 36 in response to the manual-adjust/playback/stop/enlarge button 34 being placed in an on position. The playback mode button 37 may be used to convert a current mode into a reproduction or photographing mode.

The present invention is not limited thereto however, and various modifications and other equivalent embodiments are possible. A digital photographing apparatus according to the present invention may be a camcorder or the like. In addition, the digital photographing apparatus according to the present invention may have a different shape from a shape illustrated in FIGS. 1 and 2 or may be a lens exchange type photographing apparatus, such as a single lens reflex (SLR) photographing apparatus.

Figure 3:
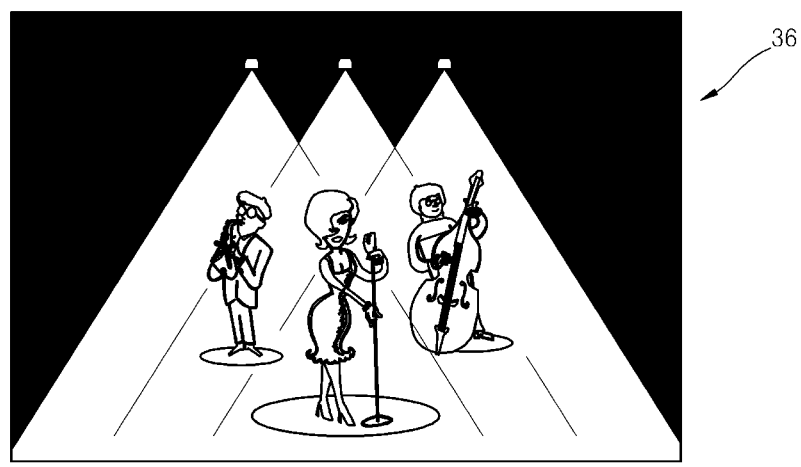
FIG. 3 illustrates a live view moving picture or a still image displayed on a display unit of the digital photographing apparatus illustrated in FIG. 1 in a normal mode, according to an example of an embodiment of the present invention.

FIG. 3 illustrates a live view moving picture or a still image displayed on a display unit of the digital photographing apparatus illustrated in FIG. 1 in a normal mode, according to an embodiment of the present invention. Referring to FIG. 3, the digital photographing apparatus illustrated in FIG. 1 may display a full sized live view moving picture or still image on the display unit 36 in a normal mode. Here, the live view moving picture is a real-time moving picture displayed on the display unit 36 so that the user can adjust composition in a photographing mode.

Meanwhile, FIG. 3 illustrates the case where a place where the user is situated is dark and a place where a subject is disposed is bright due to lighting. Specifically, FIG. 3 illustrates the case where a full sized live view moving picture of a bright play scene is displayed on the display unit 36. Here, since the place where the user is situated is dark and the place where the subject is disposed is bright, the brightness of the live view moving picture displayed on the display unit 36 is relatively high with respect to the dark place where the user is situated. Thus, if other people are around the user, they feel uncomfortable due to the glare.

Figure 4A:
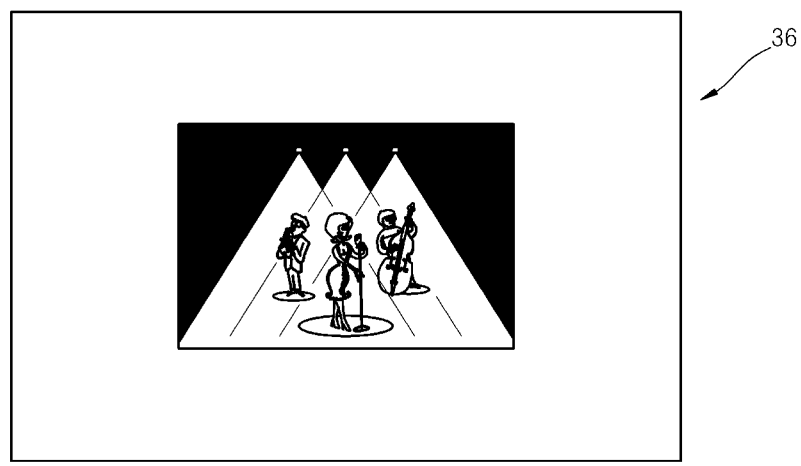
FIGS. 4A and 4B illustrate a live view moving picture or a still image displayed on the display unit of the digital photographing apparatus illustrated in FIG. 1 in a manner mode, according to an example of an embodiment of the present invention.
Figure 4B:
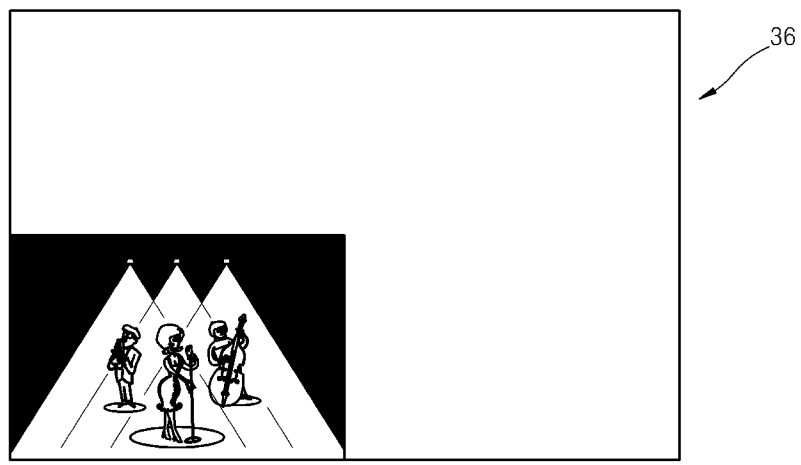

In embodiments, when the place where the user is situated is dark and the place where the subject is disposed is bright, the controller may reduce the size and/or the brightness of the live view moving picture on the display unit 36 in the photographing mode. For example, the live view moving picture may be reduced in a center of the display unit 36, as illustrated in FIG. 4A or may be reduced in a corner of the display unit 36, as illustrated in FIG. 4B, or may be reduced in other areas of the display unit 36, or the brightness may be reduced. The controller may determine to adjust the display based on the signals from an ambient brightness sensor and/or a flash-light amount sensor and/or based on setting of a manner mode. The controller may determine to adjust the display based on the hour when the controller is working. That is, if the display unit 36 displays a moving picture or a still image on the night according to the hour, the controller may determine to adjust the display. When the size of the live view moving picture displayed on the display unit 36 is reduced or the brightness lessened, other people around the user are less likely to notice the live view moving picture because of the smaller size and/or lessened brightness. As such, other people around the user in a dark environment do not feel uncomfortable due to glare resulting from the live view moving picture displayed on the display unit 36.

The present invention is not limited thereto however, and various modifications and other equivalent embodiments are possible. In embodiments, when the live view moving picture is displayed on the display unit 36, the controller may reduce the size and/or brightness of the live view moving picture in response to a user manipulation of buttons of the digital photographing apparatus or the controller may automatically adjust the brightness and/or size by responding to an ambient brightness sensor (not shown) when the signals from the ambient brightness sensor indicate that the ambient brightness is lower than a predetermined brightness. It is also possible in an embodiment that, when the live view moving picture is displayed on the display unit 36, the controller may reduce the size and/or brightness of the live view moving picture in response to a user manipulation of buttons of the digital photographing apparatus or the controller may automatically adjust the brightness and/or size by responding to the ambient brightness sensor when the signals from the ambient brightness sensor indicate that the ambient brightness is lower than a predetermined brightness for a predetermined amount of time.

In an embodiment, when the digital photographing apparatus according to the current embodiment obtains data about a still image due to a photographing operation in a photographing mode, the still image may be displayed on the display unit 36 so that the user can check what still image is obtained. In an embodiment, when an obtained still image is displayed on the display unit 36, the controller may change the size and/or brightness of the still image displayed on the display unit 36. In an embodiment, when a place where the user is situated is dark and a place where a subject is disposed is bright, the brightness of the still image displayed on the display unit 36 is relatively very high with respect to the dark place where the user is situated. Thus, if other people are around the user, they feel uncomfortable due to the glare.

Thus, when the digital photographing apparatus of FIG. 1 according to the current embodiment displays the still image that is obtained in the photographing mode on the display unit 36, the controller may adjust the size and/or brightness of the still image displayed on the display unit 36. For example, the still image may be reduced in a center of the display 36, as illustrated in FIG. 4A or may be reduced in a corner of the display unit 36, as illustrated in FIG. 4B. In this way, when the size of the still image displayed on the display unit 36 is reduced, other people around the user do not really notice the still image having a relatively small size and/or lower brightness. As such, other people around the user in a dark environment do not feel uncomfortable due to the glare resulting from the still image displayed on the display unit 36.

In this way, when the live view moving picture and/or the still image is displayed on the display unit 36, if the ambient brightness of a place where the digital photographing apparatus is disposed is less than a predetermined brightness (for a predetermined amount of time), the size and/or brightness of the live view moving picture and/or the still image displayed on the display unit 36 may be reduced by the controller. The controller may perform this operation by responding to signals from an ambient brightness sensor (not shown) as described above and/or by responding to buttons being pressed by a user. For example, a menu-OK button 15M, being pressed for a short or long time, to access a manner mode may be used to adjust the size and/or brightness of the live view moving picture and/or the still image displayed on the display unit 36. In embodiments, the present invention may be used in a playback mode in which a moving picture or a still image is displayed on the display unit 36 from data stored in a storage medium. In embodiments, when a moving picture or a still image is displayed on the display unit 36 from data stored in a storage medium, the size and/or brightness of the moving picture or still image displayed on the display unit 36 may be changed by the controller. In embodiments, when the moving picture or the still image is displayed on the display unit 36 from the data stored in the storage medium in a dark place, other people around the user may feel uncomfortable due to the glare resulting from the relatively high brightness of the moving picture or still image displayed on the display unit 36. Thus, when the ambient brightness of a place where the digital photographing apparatus is disposed is less than a predetermined brightness, the size and/or brightness of the moving picture or still image displayed on the display unit 36 may be reduced. In embodiments, in a manner mode, the size of the moving picture or still image displayed on the display unit 36 may be smaller than the maximum size of the moving picture or still image that can be displayed on the display unit 36.

In embodiments, the size and/or brightness of a live view moving picture or an obtained still image is not changed until after a predetermined time. In embodiments, the live view moving picture is displayed on the display unit in the photographing mode so that the user can select photographing composition while seeing the live view moving picture. In embodiments, the controller is configured to adjust the live view moving picture after a predetermined period of time so that the user can adjust the composition of the live view moving picture before the controller adjusts the size and/or brightness of the live view moving picture. In embodiments, the controller is configured to stop displaying the live view moving picture on the display unit after a predetermined period of time so that other people around the user in a dark place do not feel uncomfortable due to the brightness of the live view moving picture.

The present invention is not limited thereto however, and various modifications and other equivalent embodiments are possible. In embodiments, the controller is configured to display the live view moving picture or the obtained still image on the display unit in the photographing mode for only a predetermined period of time, when the ambient brightness of a place where the digital photographing apparatus is disposed is less than a predetermined brightness.

In embodiments, when a live view moving picture or an obtained still image is displayed on a display unit in a photographing mode the controller may be configured to reduce the brightness of the display unit after a predetermined time when the ambient brightness of a place where the digital photographing apparatus is disposed is less than a predetermined brightness. In embodiments, the controller is configured to display the live view moving picture with general brightness on the display unit so as to permit the user to easily adjust composition by using the live view moving picture. The controller may be configured to lower the brightness after the predetermined time, so that other people around the user in a dark place do not feel uncomfortable due to the glare resulting from the very bright live view moving picture.

In embodiments, when a moving picture or a still image is displayed on a display unit from data stored in a storage medium, the controller may reduce the brightness of the display unit after a predetermined time. In embodiments, the controller first displays the moving picture or still image with general brightness on the display unit so as to give the user the ability to check the type of the moving picture or still image, and after the predetermined time, the controller may reduce the brightness on the display unit so that other people around the user in a dark place do not feel uncomfortable due to the glare resulting from the very bright live view moving picture. The present invention is not limited thereto however, and various modifications and other equivalent embodiments are possible. In embodiments, only when the ambient brightness of a place where the digital photographing apparatus is disposed is less than a predetermined brightness, may the brightness of the display unit be reduced by the controller after the predetermined time.

In embodiments, the digital photographing apparatus may include an ambient brightness sensor and a flash-light amount sensor. The controller may be configured to adjust the size and/or the brightness of a moving picture or an image displayed on the display unit based on the amount of light determined to be needed by the flash-light amount sensor for taking a live moving picture or for taking a live still image.

Embodiments have at least the advantage that people may not feel uncomfortable in a dark environment due to a very bright image of a display unit of the display photographing apparatus when an ambient brightness of a place where the digital photographing apparatus is positioned is low. Additionally, embodiments have the advantage of permitting the user of the digital photographing apparatus to manually adjust the brightness and/or the size of the displayed image. Additionally, embodiments have the advantage of permitting the user of the digital photographing apparatus to adjust the image of a live view moving picture or an obtained still image before reducing the size and/or brightness of the live view moving picture or the obtained or live still image.

The various functional descriptions described in connection with the embodiments disclosed herein including descriptions of the controller may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A digital photographing apparatus, comprising:
   a display unit;
   an ambient brightness sensor that detects a brightness of a place where the digital photographing apparatus is located; and
   a controller electronically coupled to the display unit, wherein when the brightness sensor determines that the apparatus is located in a dark place the controller reduces the size of a moving picture or an image to be displayed on the display unit and displays the moving picture or the image on only a portion which is less than all of the display area of the display unit.

2. The digital photographing apparatus of claim 1, wherein the controller is configured to adjust the moving picture or the image displayed by reducing the brightness of the moving picture or the imaged displayed on the display unit.

3. The digital photographing apparatus of claim 1, wherein the controller is configured to adjust the moving picture or the image displayed by reducing the brightness and reducing the size of the moving picture or the imaged displayed on the display unit.

4. The digital photographing apparatus of claim 1, wherein the controller is configured to adjust the moving picture or the image displayed on the display unit only after a predetermined period of time.

5. The digital photographing apparatus of claim 1, further comprising an ambient brightness sensor, wherein the controller is electronically coupled to the ambient brightness sensor and configured to adjust the moving picture or the image displayed on the display unit based on the ambient brightness detected by the ambient brightness sensor.

6. The digital photographing apparatus of claim 5, wherein the controller is further configured to adjust the moving picture or the image displayed on the display unit when the ambient brightness detected by the ambient sensor is less than a predetermined brightness.

7. The digital photographing apparatus of claim 5, wherein the controller is further configured to adjust the moving picture or the image displayed on the display unit when the ambient brightness detected by the ambient sensor is less than a predetermined brightness for a predetermined amount of time.

8. The digital photographing apparatus of claim 5, wherein the controller is further configured to adjust the moving picture or the image displayed on the display unit based on comparing the ambient brightness detected by the ambient brightness sensor with the brightness of the moving picture or the image displayed on the display unit.

9. The digital photographing apparatus of claim 1, further comprising a manner mode switch electrically coupled to the controller,
   wherein the controller is further configured to adjust the moving picture or the image displayed only if the manner mode switch is on.

10. The digital photographing apparatus of claim 1, further comprising a flash-light amount sensor electrically connected to the controller,
    wherein the controller is configured to adjust the moving picture or the image displayed based on the amount of light determined to be needed by the flash-light amount sensor for taking a live moving picture or for taking a live still image.

11. The digital photographing apparatus of claim 1, wherein the moving picture or the image displayed on the display unit is a live moving picture or a live image displayed on the display unit.

12. The digital photographing apparatus of claim 1, wherein the moving picture or the image displayed on the display unit is from data stored in a storage medium.

13. A digital photographing apparatus, comprising:
a display unit;
a manner mode switch;
an ambient brightness sensor that detects a brightness of a place where the digital photographing apparatus is located; and
a controller electronically coupled to the display unit and the manner mode switch,
wherein when the brightness sensor determines that the apparatus is located in a dark place the controller reduces the size of a moving picture or an image to be displayed on the display unit when the manner mode switch is on to reduce a lumen output of the display unit, and displays the moving picture or the image on only a portion which is less than all of the display area of the display unit.

14. The digital photographing apparatus of claim 13, wherein the controller is configured to adjust the moving picture or the image displayed by reducing the brightness of the moving picture or the imaged displayed on the display unit.

15. The digital photographing apparatus of claim 13, wherein the controller is configured to adjust the moving picture or the image displayed on the display unit only after a predetermined period of time.

16. The digital photographing apparatus of claim 13, further comprising:
a manual reduce button electrically connected to the controller; and
a manual enlarge button electrically connected to the controller,
wherein the controller is configured to reduce the size of the moving picture or the image displayed on the display unit when the reduce button is on, and the controller is configured to enlarge the size of the moving picture or the image displayed on the display unit when the enlarge button is on.

17. The digital photographing apparatus of claim 13, further comprising:
a manual reduce button electrically connected to the controller; and
a manual enlarge button electrically connected to the controller,
wherein the controller is configured to reduce the brightness of the moving picture or the image displayed on the display unit when the reduce button is on, and the controller is configured to increase the brightness of the moving picture or the image displayed on the display unit when the enlarge button is on.

* * * * *